United States Patent [19]

Girard

[11] Patent Number: 4,692,968
[45] Date of Patent: Sep. 15, 1987

[54] METHOD AND MEANS FOR SECURING PLASTIC COVERED EQUIPMENT TO A SUPPORT SURFACE

[75] Inventor: Leon E. Girard, Ames, Iowa

[73] Assignee: Iowa State University Research Foundation Inc., Ames, Iowa

[21] Appl. No.: 776,304

[22] Filed: Sep. 16, 1985

[51] Int. Cl.$^4$ ............................................. A43C 7/00
[52] U.S. Cl. ........................................ 24/145; 24/693;
 24/696; 411/400; 411/509
[58] Field of Search ................ 24/145, 140, 693, 696;
 411/400, 500, 483, 484–486, 508–510, 490

[56] References Cited

U.S. PATENT DOCUMENTS

| | | |
|---|---|---|
| 866,492 | 9/1907 | Lipscomb .......................... 411/486 |
| 1,142,688 | 6/1915 | Fischer .............................. 411/484 |
| 3,214,504 | 10/1965 | Gemberling . |
| 3,580,793 | 5/1971 | Hewitt . |
| 3,820,221 | 6/1974 | Mercer . |
| 3,998,824 | 12/1976 | Otsuki et al. . |
| 4,104,339 | 8/1978 | Fetz et al. . |
| 4,136,275 | 1/1979 | McCullough . |
| 4,414,166 | 11/1983 | Charlson et al. . |
| 4,473,984 | 10/1984 | Lopez ........................... 411/400 X |

FOREIGN PATENT DOCUMENTS

| | | |
|---|---|---|
| 557219 | 2/1957 | Italy ................................. 411/453 |
| 147433 | 8/1931 | Switzerland ..................... 411/500 |
| 1342 | of 1888 | United Kingdom ................ 24/145 |
| 12895 | of 1903 | United Kingdom .............. 411/484 |

Primary Examiner—Kenneth J. Dorner
Assistant Examiner—James R. Brittain
Attorney, Agent, or Firm—Zarley, McKee, Thomte, Voorhees & Sease

[57] ABSTRACT

Plastic covered equipment is secured to a support surface such as a table or the like by first and second interconnected coupling devices. The first coupling device is mounted on the support surface, while the second coupling device is embedded into the plastic covered equipment. The second coupling device includes a body member having a stub shaft secured to the first end thereof which terminates in a pointed probe head having an inner face with a greater diameter than that of the stub shaft. A concave surface on the first end of the body member surrounds the stub shaft and terminates in an arcuate annular shoulder on the first end of the body member. The annular shoulder has a diameter greater than that of the probe head and creates an annular space with respect to the inner face of the probe head. To embed the second coupling device into the plastic material, the device is heated to a temperature sufficiently high to melt the plastic and is held in contact with the plastic material such that the material melts and flows around the probe head and into engagement with the concave surface and then into the annular space so as to completely embed the probe head, the stub shaft and the annular shoulder with melted plastic material. The plastic material is then cooled so as to solidify and firmly embed the second coupling device therein.

2 Claims, 5 Drawing Figures

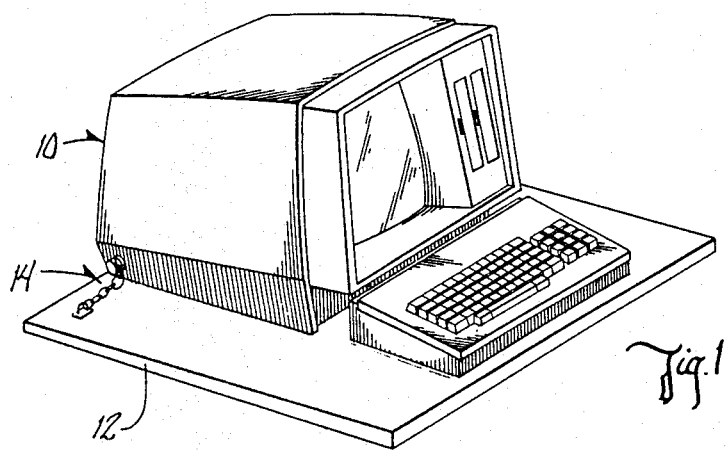
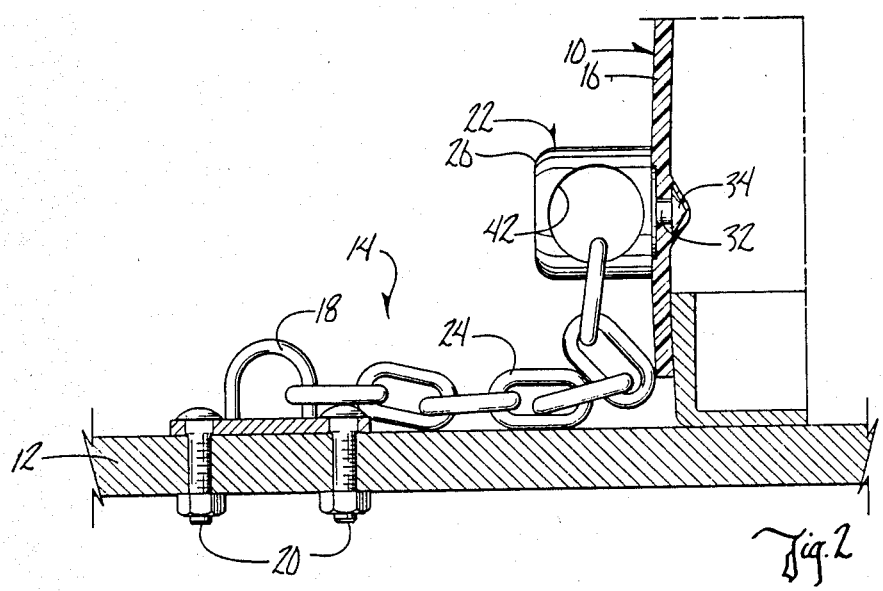
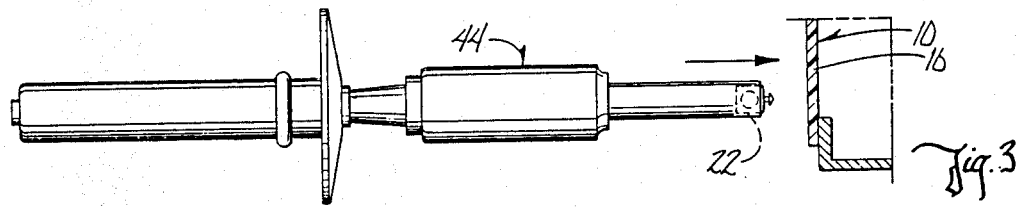
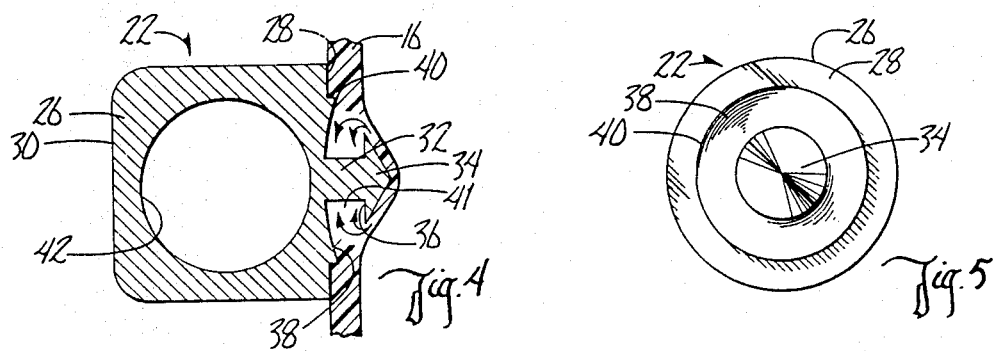

4,692,968

METHOD AND MEANS FOR SECURING PLASTIC COVERED EQUIPMENT TO A SUPPORT SURFACE

BACKGROUND OF THE INVENTION

Theft of computer terminals, microprocessors, word processors and the like is a concern for owners of such equipment. Generally, such equipment is valuable and therefore it is desirable to secure such equipment to a table, desk or the like so as to prevent theft thereof. Such equipment is commonly housed in a plastic shell.

Therefore, a primary objective of the present invention is the provision of a method and means for quickly and easily securing plastic covered equipment to a support surface.

A further objective of the present invention is the provision of a coupling device to be embedded in the plastic housing of valuable equipment such that the equipment can be secured to a support surface.

Another objective of the present invention is the provision of a method for embedding a coupling device into the plastic housing of plastic covered equipment. These and other objectives will be apparent from the following description of the present invention.

SUMMARY OF THE INVENTION

A method of securing plastic covered equipment to a support surface comprises mounting a first coupling device on the support surface, embedding a second coupling device into the plastic material covering the equipment, and interconnecting the first and second coupling devices. The second coupling device includes a body member having opposite ends, a stub shaft secured to one of the ends and extending outwardly therefrom along the axis of the device, a pointed probe head secured to the outer end of the stub shaft and having an inner face substantially parallel to the end of the body member with the diameter of the inner face being greater than that of the stub shaft, and a concave surface on the first end of the body member surrounding the stub shaft and terminating in an arcuate annular shoulder on the first end of the body member. The diameter of the annular shoulder is greater than that of the probe head which is spaced apart from the annular shoulder so as to create an annular space therebetween. Embedding the second coupling device into the plastic material involves the steps of heating the coupling device to a temperature sufficiently high to melt the plastic material, holding the coupling device in contact with the plastic material such that the material melts, permitting the plastic material to flow around the probe head and into engagement with the concave surface and thence into the annular space so as to completely embed the probe head, the stub shaft and the annular shoulder with the melted plastic material, and cooling the plastic material such that the coupling device is firmly embedded therein.

BRIEF DESCRIPTION OF THE DRAWINGS

FIG. 1 is a perspective view of a plastic covered equipment unit secured to a support surface in accordance with the present invention.

FIG. 2 is an enlarged sectional view showing the means for securing the unit to the support surface.

FIGS. 3 and 4 are views showing how the second coupling device of the present invention is embedded into the plastic housing of the unit.

FIG. 5 is an end view of the second coupling member of the present invention.

DETAILED DESCRIPTION OF THE DRAWINGS

FIG. 1 generally shows a plastic covered equipment unit 10 secured to a support surface 12 by a securement means 14, in accordance with the present invention. It is understood that securement means 14 can be utilized on any type of plastic covered equipment, such as computer terminals, microprocessors, word processors, or the like. Generally, such equipment is mounted within a plastic shell or housing 16.

As best seen in FIG. 2, securement means 14 includes a first coupling device 18 anchored to support surface 12 by bolt assemblies 20 and a second coupling device 22 embedded into plastic housing 16 of unit 10. A chain 24 or a similar securing line interconnects first coupling device 18 with second coupling device 22 such that the plastic covered equipment is secured to support surface 12.

More particularly, second coupling device 22 includes a body member 26 having first and second ends 28 and 30, respectively. A stub shaft 32 extends outwardly from body member 26 along a central axis thereof and terminates in a pointed probe head 34 having an inner face 36. Inner face 36 is substantially parallel to first end 28 of body member 26 and the diameter of inner face 36 is greater than that of stub shaft 32. First end 28 of body member 26 also has a concave surface 38 which surrounds stub shaft 32 and terminates in an arcuate annular shoulder 40 having a diameter greater than that of inner face 36 of probe head 34. Body member 26 also has an aperture 42 extending therethrough for receiving one end of connecting line 24.

To secure plastic covered equipment 10 to support surface 12, first coupling device 18 is mounted on support surface 12 by bolt assemblies 20 and second coupling device 22 is embedded into plastic housing 16. The coupling devices are then interconnected by connecting line 24.

More particularly, the method of embedding second coupling device 22 into plastic housing 16 comprises the following steps. First, coupling device 22 is heated by a heating element 44 or the like to a temperature sufficiently high to melt plastic housing 16. Then, coupling device 22 is held in contact with plastic housing 16 such that the plastic material melts. As the plastic material melts, the material flows around probe head 34 and into engagement with concave surface 38 which directs the melted plastic into annular space 41 such that the melted plastic material completely embeds probe head 34, stub shaft 32 and annular shoulder 40. The concave-shaped surface 38 serves the important function of directing the melted plastic material in the directions shown by the arrows in FIG. 4 to insure the complete embedding of these components in the plastic material. Plastic housing 16 is then cooled such that the plastic material solidifies, thereby firmly embedding second coupling device 22 in plastic housing 16.

From the foregoing, it is seen that at least all of the stated objectives are accomplished.

What is claimed is:

1. A coupling device to be embedded in plastic material for attachment to a locking means, comprising:

a body member having first and second ends, and a central axis;

a stub shaft secured to said first end of said body member and extending outwardly therefrom on said central axis;

a pointed probe head secured to the outer end of said stub shaft, and having an inner face parallel to a portion of said first end of said body member, and with a diameter greater than the diameter and greater than the length of said stub shaft;

a concave surface on said first end and surrounding said stub shaft and terminating in an arcuate annular shoulder on said first end, said annular shoulder having a diameter greater than that of said inner face of said probe head and creating an annular space with respect to said inner face of said probe head, said portion of said first end surrounding said annular shoulder and recessed relative to said annular shoulder, whereby, when said probe head is heated and forcibly embedded into a plastic material, the plastic material will melt and will be induced to flow around said probe head into engagement with said concave surface and thence into said annular space to completely embed said probe head, said stub shaft and said annular shoulder with such melted plastic material; and means on said body member for attachment to a locking means.

2. The coupling device of claim 1 wherein said means on said body for attachment to a locking means includes an aperture extending through said second end of said body through which said locking means extends.

* * * * *